United States Patent
Cashler et al.

[11] Patent Number: 5,430,649
[45] Date of Patent: Jul. 4, 1995

[54] SIR DEPLOYMENT METHOD BASED ON OCCUPANT DISPLACEMENT AND CRASH SEVERITY

[75] Inventors: Robert J. Cashler; Jon P. Kelley, both of Kokomo, Ind.

[73] Assignee: Delco Electronics Corporation, Kokomo, Ind.

[21] Appl. No.: 157,512

[22] Filed: Nov. 26, 1993

[51] Int. Cl.6 .............. B60R 21/12; B60R 21/32
[52] U.S. Cl. .................. 364/424.05; 340/436; 307/10.1; 280/734; 280/735; 180/274; 180/282
[58] Field of Search ............. 364/424.05; 280/735, 280/734; 307/10.1; 180/268, 282, 274; 340/436, 438, 669

[56] References Cited

U.S. PATENT DOCUMENTS

| | | | |
|---|---|---|---|
| 4,985,835 | 1/1991 | Sterler et al. | 364/424.05 |
| 5,014,810 | 5/1991 | Mattes et al. | 180/268 |
| 5,040,118 | 8/1991 | Diller | 364/424.05 |
| 5,071,160 | 12/1991 | White et al. | 280/735 |
| 5,229,943 | 7/1993 | Eigler et al. | 364/424.05 |
| 5,256,904 | 10/1993 | Tohbaru | 307/10.1 |
| 5,330,226 | 7/1994 | Gentry et al. | 280/735 |

*Primary Examiner*—Kevin J. Teska
*Assistant Examiner*—Tyrone V. Walker
*Attorney, Agent, or Firm*—Mark A. Navarre

[57] ABSTRACT

A two-step deployment control method for a supplemental inflatable restraint (SIR) in a vehicle. The deployment decision includes a "time to wait" step in which the control determines "when to deploy", and a "severity" step in which the control determines "whether to deploy". The "time to wait" step is based on an estimation of occupant displacement due to the crash, and the "severity" step is based on an estimation of the crash severity. The control method is modified to initiate earlier deployment when the acceleration data is indicative of a localized impact which does not involve the full front structure of the vehicle, such as an angle or pole impact.

10 Claims, 7 Drawing Sheets

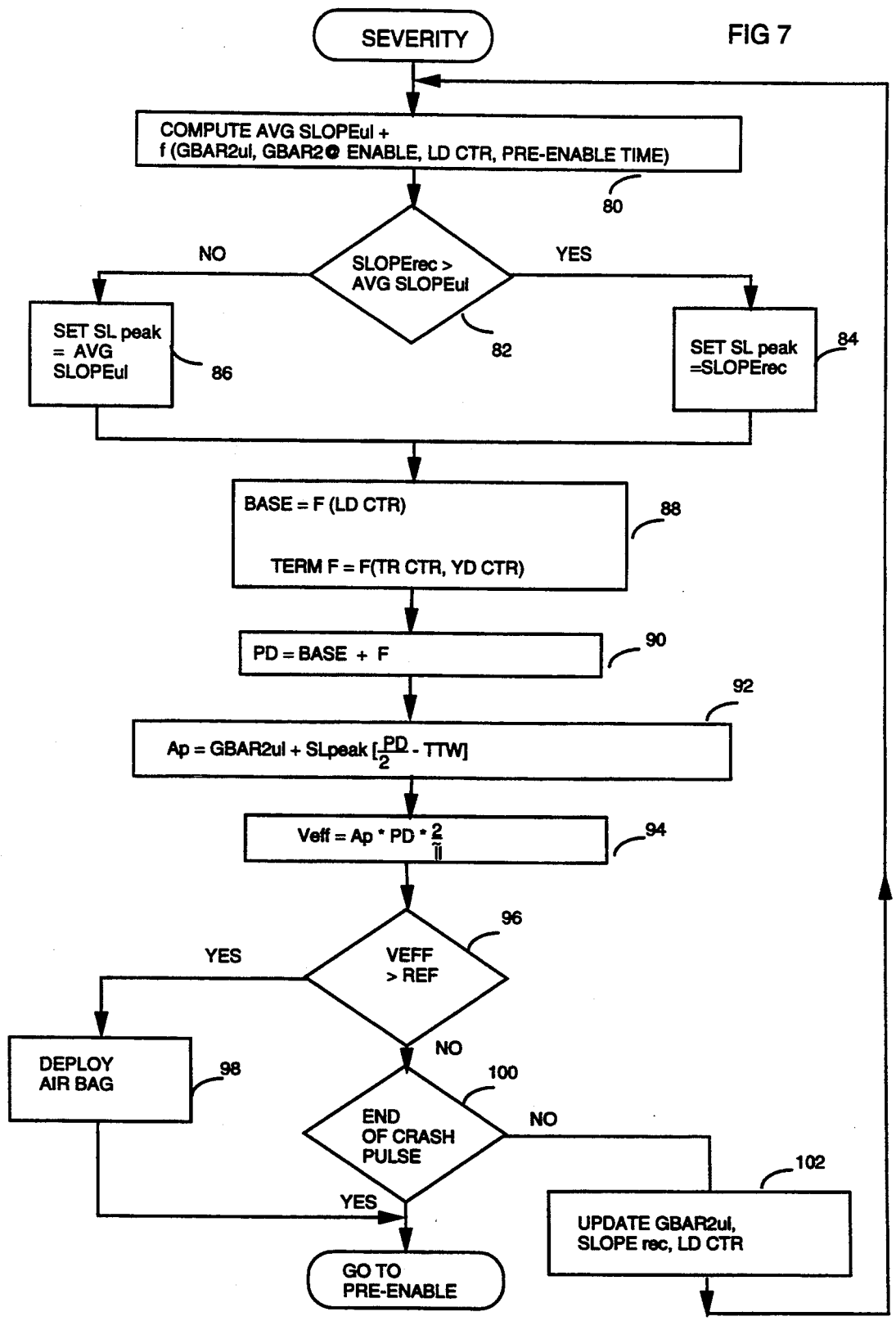

SIR DEPLOYMENT METHOD BASED ON OCCUPANT DISPLACEMENT AND CRASH SEVERITY

This invention relates to a control method for deploying a motor vehicle supplemental inflatable restraint, and more particularly, to a control method employing a two step deployment determination which maximizes the interval of data collection before the actual deployment decision is made.

BACKGROUND OF THE INVENTION

In state-of-the-art supplemental inflatable restraint (SIR) systems, the decision to deploy an air bag is based on an estimate of the severity of a crash, as determined by an analysis of measured vehicle acceleration. According to one technique, the vehicle acceleration is compared to a predetermined time-dependent boundary curve, and deployment is commanded if and when the boundary curve is exceeded.

SUMMARY OF THE PRESENT INVENTION

The present invention is directed to an improved SIR deployment control method in which the deployment decision comprises a two step method which analyzes predicted occupant displacement as well as crash severity. The performance requirements of a SIR system are frequently specified in terms of maximum occupant displacement at the time of deployment, assuming that the crash severity would warrant deployment. The control method of the present invention uses this requirement to advantage by a two step method which determines "when to deploy" before determining "whether to deploy". The "when to deploy" determination is based on a prediction of occupant displacement due to the crash, and the "whether to deploy" determination is based on an estimation of the crash severity. As a result, the actual deployment decision is delayed as long as performance requirements permit, thereby maximizing the interval of acceleration data collection, possibly preventing unwarranted deployment. According to another aspect of this invention, the control method is modified to initiate earlier deployment when the acceleration data is indicative of a localized impact which does not involve the full front structure of the vehicle, such as an angle or pole impact.

BRIEF DESCRIPTION OF THE DRAWINGS

FIG. 7 depicts a flow diagram outlining a Severity routine in accordance with the control of this invention.

DETAILED DESCRIPTION OF THE DRAWINGS

Figure 1:
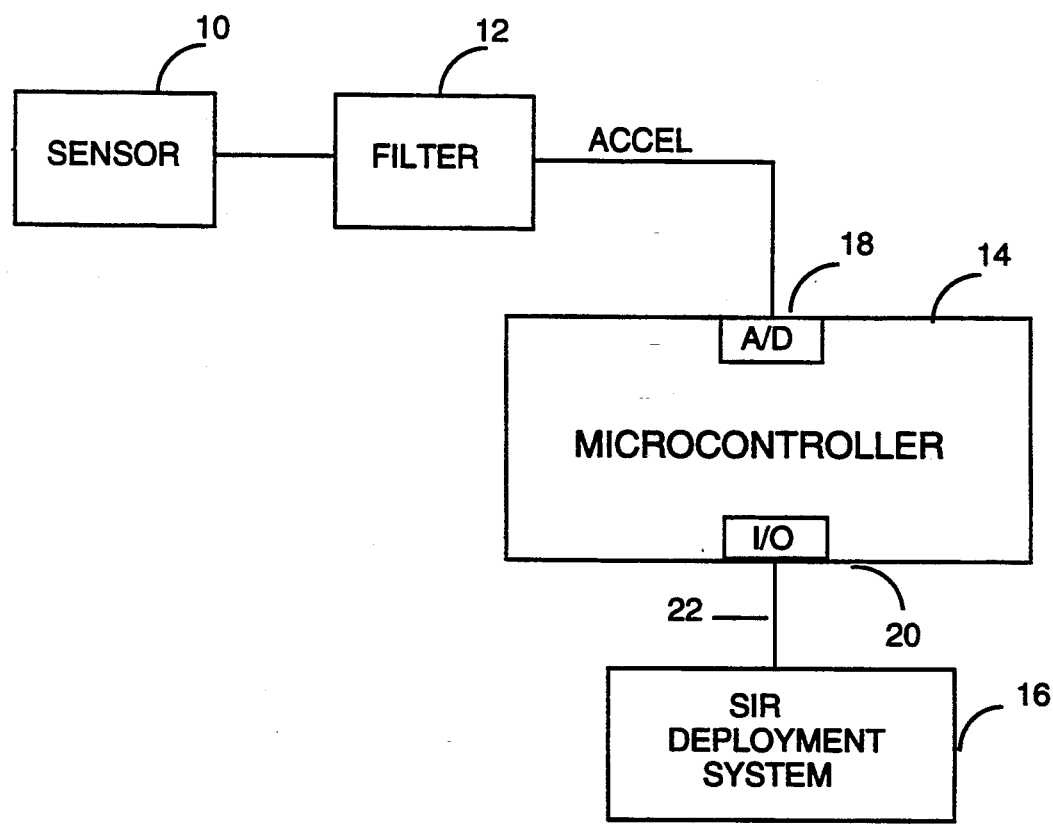
FIG. 1 is a system diagram of a SIR system.

Referring now to the drawings, FIG. 1 generally depicts a SIR system comprising an accelerometer 10, a hardware low-pass filter 12, a micro-controller 14 and a deployment system 16. The elements 10, 12, 14 and 16 may be generally conventional, except for the functionality of the micro-controller 14 under the direction of the control software described herein. Accelerometer 10 is rigidly mounted to a vehicle frame element (not shown) to provide an analog electrical signal corresponding to the acceleration, positive or negative, along the longitudinal axis of the vehicle. The acceleration signal is applied to filter 12 to form a filtered acceleration signal input ACCEL, which is applied as an input to an A/D input port 18 of micro-controller 14 for analysis according to this invention as described hereinafter. In addition to the A/D port 18, micro-controller 14 comprises conventional electronic componetry, including a microprocessor, random-access and read-only memories, and a suitable output port 20 for issuing a deployment command to the deployment system 16 when warranted by the acceleration signal analysis. Upon receipt of a deployment command on line 22, the deployment system 16 triggers air bag inflation to arrest the displacement of the vehicle occupants. The time required for such inflation is assumed for the purpose of this disclosure to be approximately 30 ms.

Figure 2:
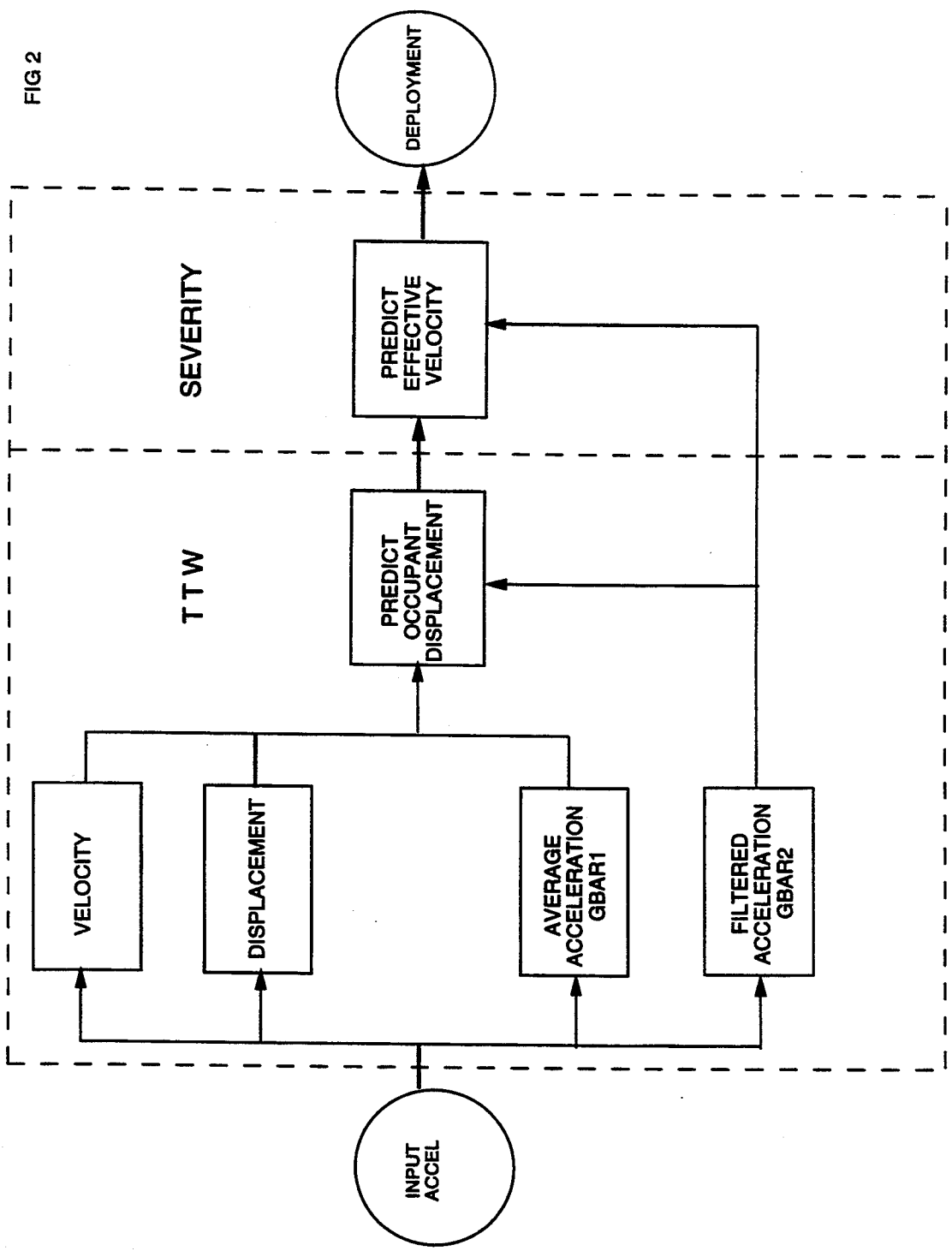
FIG. 2 is a block diagram of the two-step method of this invention.

As noted above, the present invention is directed to an improved control method implemented by control software resident within the micro-controller 14 for timely issuing a deployment command to the deployment system 16. The control method principally involves two successive steps, referred to herein as time-to-wait TTW and Severity. The TTW step determines when to deploy the SIR, while the Severity step determines whether to deploy the SIR. This approach is broadly depicted by the block diagram of FIG. 2. In the TTW step, the input acceleration ACCEL is integrated, averaged, and filtered to predict the occupant displacement a predetermined time (30 ms) in the future, where the predetermined time corresponds to the time required to inflate the air bag once a deployment command is issued. As soon as the predicted occupant displacement reaches a threshold determined in relation to the desired occupant displacement at the time of inflation, the severity phase of the control is initiated to estimate the effective vehicle velocity of the crash event at SIR inflation, referred to herein as the effective velocity. If the effective velocity exceeds a predetermined threshold, the crash is severe enough to warrant deployment, and a deployment command is issued.

Figure 3:
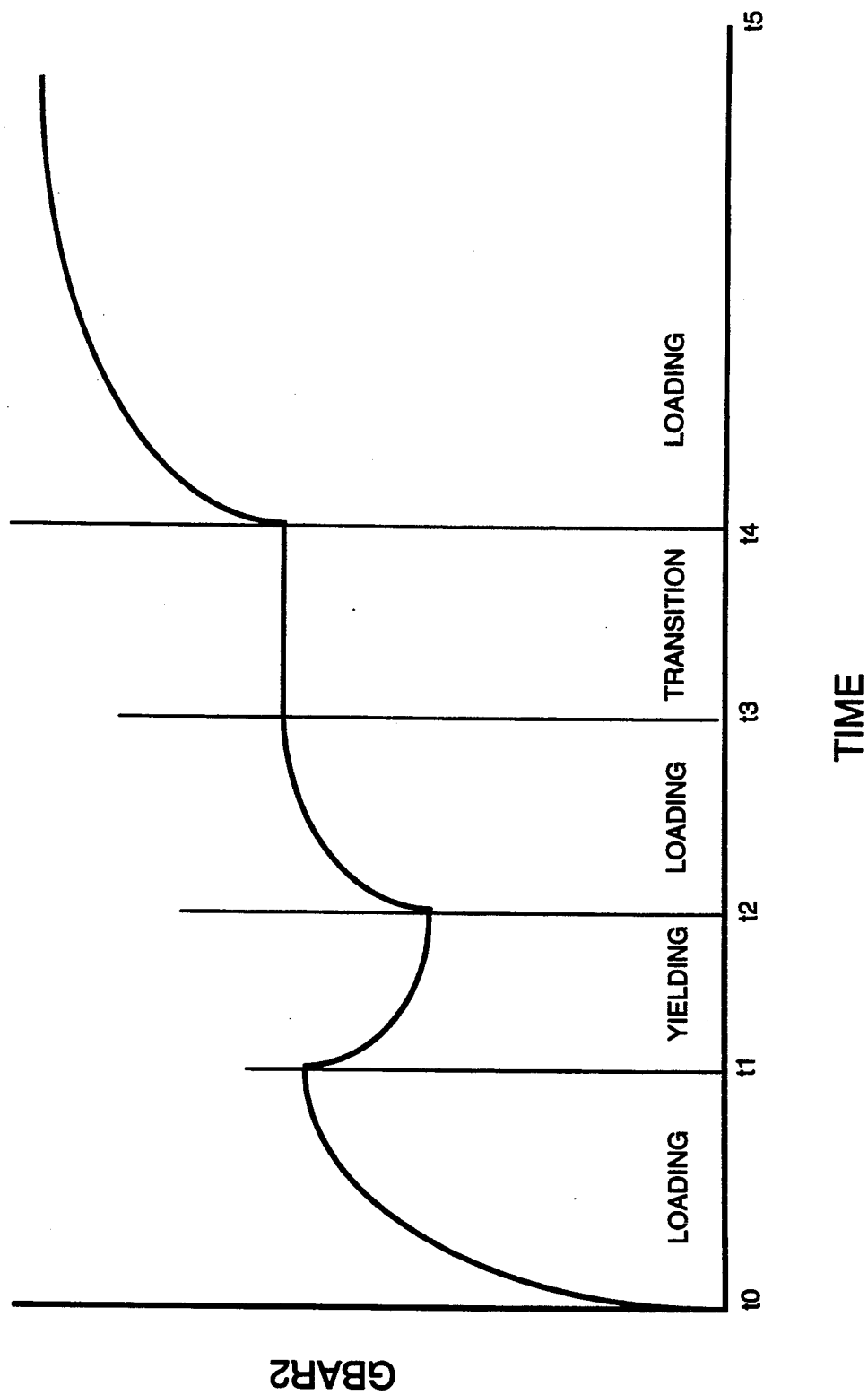
FIG. 3 is a graph depicting different acceleration phases observed in localized impacts.

The deployment method of this invention thereby extends the amount of data gathering time, compared with traditional deployment methods, without exceeding the desired occupant displacement at the time of inflation. This is especially significant since the acceleration data can provide a key to identifying localized (as opposed to barrier) impacts. Localized impacts typically involve multiple loading phases separated by a yielding phase where certain structures of the vehicle collapse. This effect is graphically depicted in FIG. 3, where loading phases occur in the intervals t0-t1, t2-t3 and t4-t5. A yielding phase occurs in the interval t1-t2 intermediate the first and second loading phases, and a period of transition (neither loading nor yielding) occurs in the interval t3-t4 intermediate the second and third loading phases. In the course of a crash event, the time and acceleration spent in loading, the time spent in yielding, and the time spent in transition are measured and used to appropriately gauge the apparent severity of the event.

Figure 4:
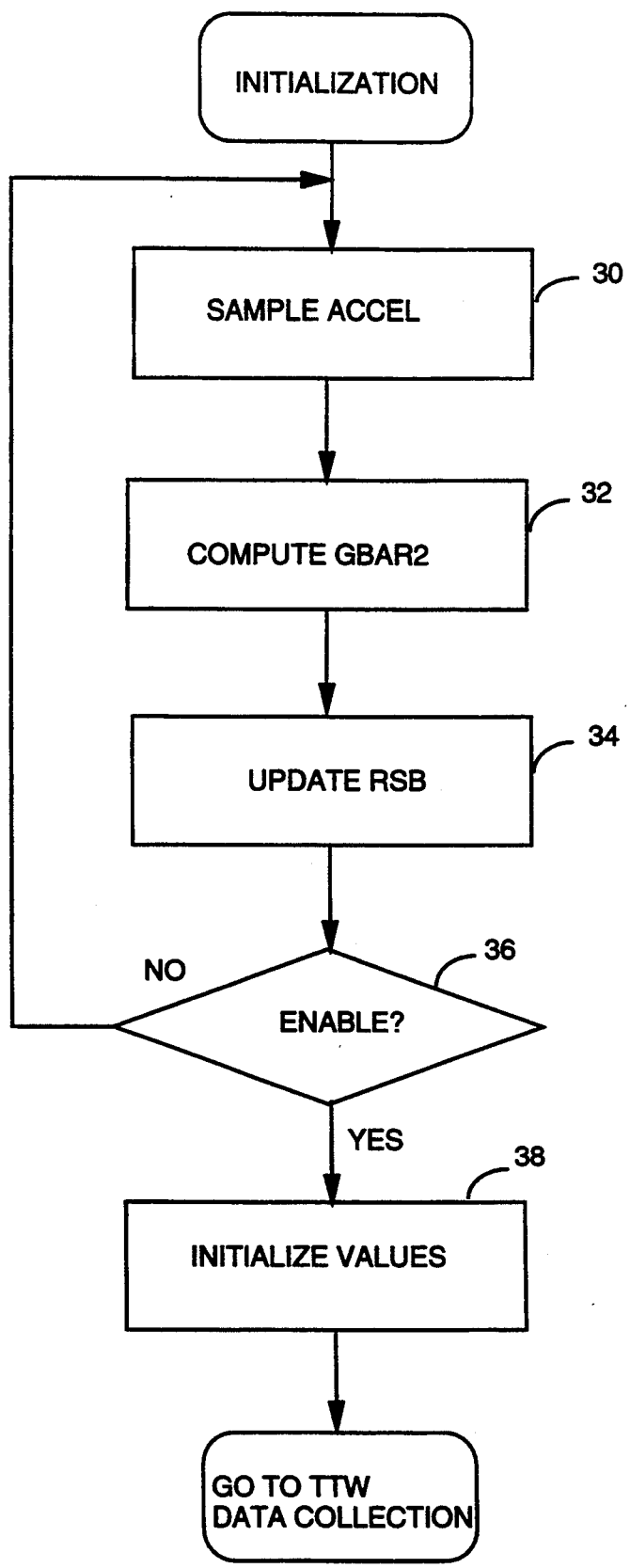
FIG. 4 is a flow diagram outlining a Pre-enable routine in accordance with the control of this invention.
Figure 5:
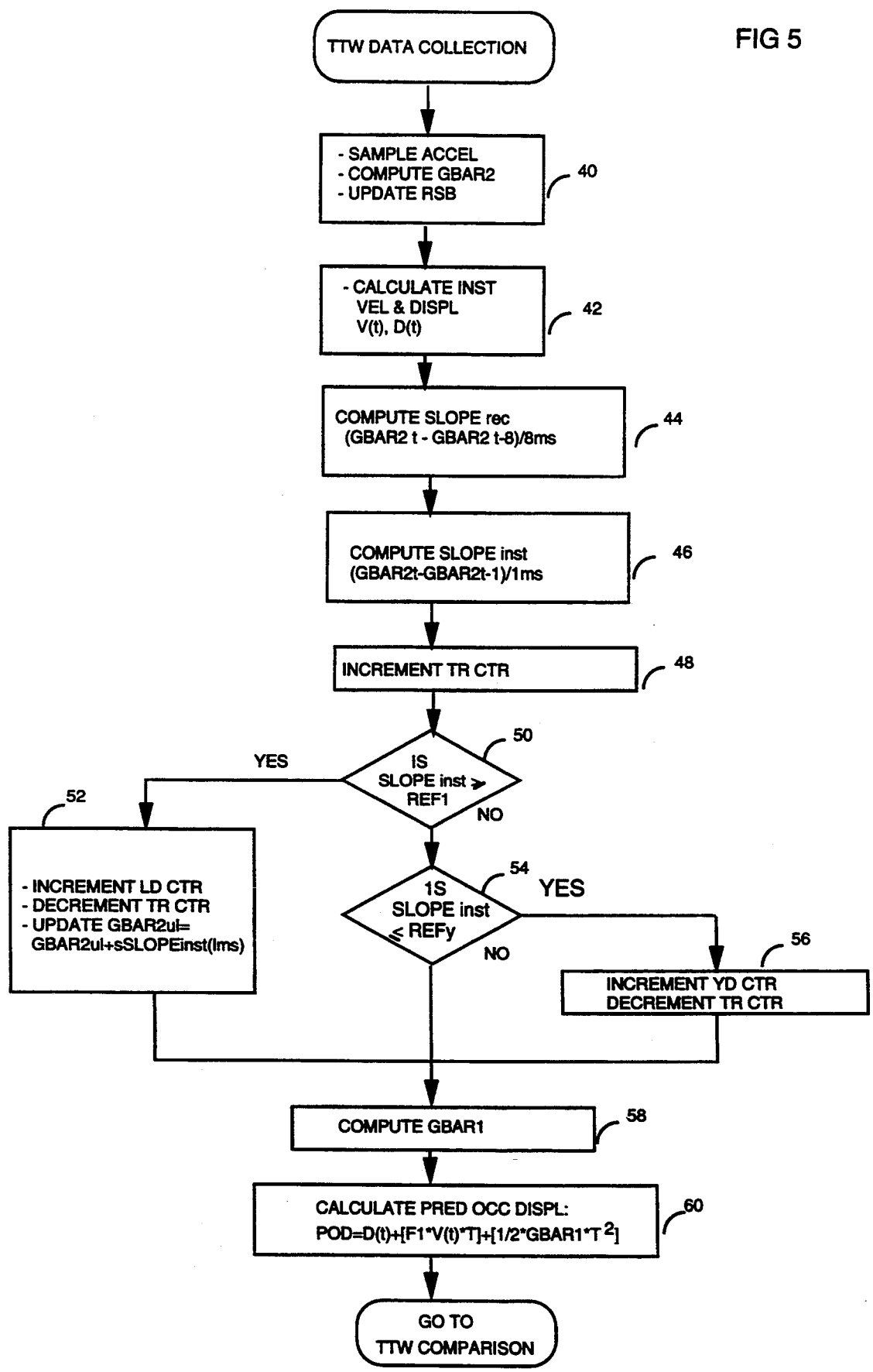
FIGS. 5-6 depict flow diagrams outlining a Time-To-Wait routine in accordance with the control of this invention.
Figure 6:
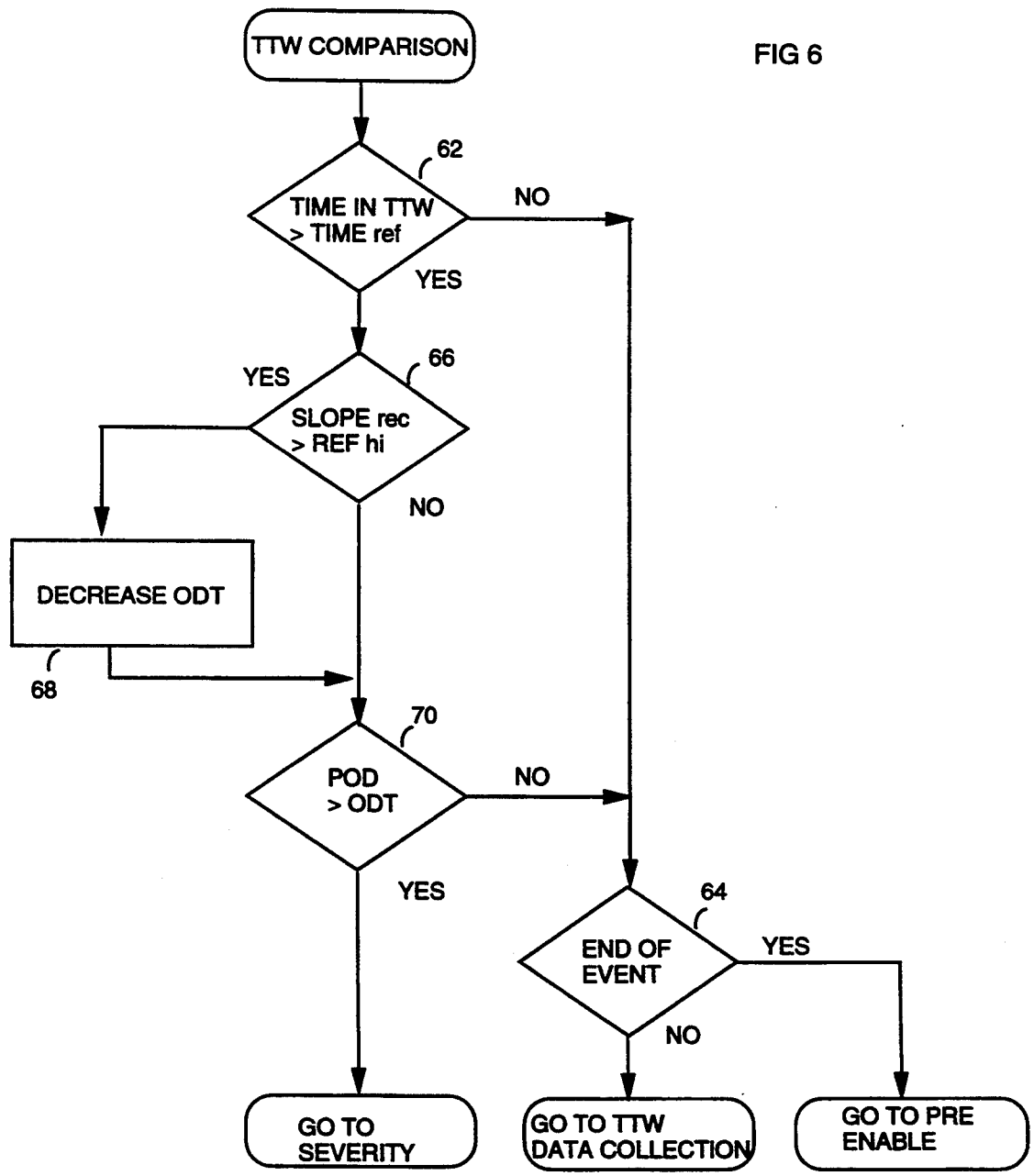

The control algorithm of this invention is carried out by the micro-controller 14 with a set of software routines generally outlined by the flow diagrams of FIGS. 4–7. FIG. 4 depicts a pre-enable routine for detecting the initiation of a possible crash event. In the pre-enable routine, the micro-controller 14 determines if a filtered version of the acceleration signal ACCEL exceeds an initial threshold value, indicating the possible occurrence of a vehicle crash incident. If the initial acceleration threshold is exceeded, the TTW step, outlined in the flow diagrams of FIGS. 5–6, is enabled to determine, based on continued sampling of the acceleration signal ACCEL, whether a predicted occupant displacement due to the vehicle deceleration has reached a predetermined displacement. If the predetermined displacement is achieved, the Time-To-Wait is over, and the micro-controller 14 executes the Severity step, outlined in the flow diagram of FIG. 7 to determine if the crash severity warrants deployment.

The Pre-Enable flow diagram is entered upon system initialization at an update rate of once per 1ms, and serves as an entry point to the TTW step, as indicated above. After sampling the acceleration input ACCEL at block 30, the blocks 32–34 are successively executed to further filter ACCEL to form a crash pulse signal GBAR2, and to enter the GBAR2 value into an eight-place first-in-first-out Recent Slope Buffer (RSB). At block 36, an average of the two most recent sampled acceleration values are compared to a threshold acceleration value to determine whether to enable the TTW routine of FIGS. 5–6. If the determined average exceeds the threshold, block 38 is executed as initialization to save the current GBAR2 value, to initialize certain variable values, and to determine the pre-enable time. The pre-enable time is the time prior to TTW enable for which successive GBAR2 samples exceeded the threshold acceleration value.

The TTW routine of FIGS. 5–6 is functionally divided into two parts: TTW Data Collection (FIG. 5) and TTW Comparison (FIG. 6). The TTW Data Collection portion of the routine is executed first, and serves to compute the Predicted Occupant Displacement (POD); the TTW Comparison portion of the routine compares the POD and other relevant parameters with threshold values to determine if the Severity routine should be enabled.

Referring now to the TTW Data Collection portion of the TTW routine in FIG. 5, the block 40 is first executed to sample the acceleration input ACCEL, to compute a new value of GBAR2, and to correspondingly update the Recent Slope Buffer (RSB). The block 42 is then executed to calculate instantaneous velocity and displacement values V(t) and D(t) from the acceleration input ACCEL. Then, the blocks 44 and 46 are executed to determine recent average and instantaneous slope variables SLOPErec and SLOPEinst, based on the GBAR2 values stored in the Recent Slope Buffer. The recent average slope variable SLOPErec is based on the difference between the first and last GBAR2 values stored in the RSB over an 8 ms interval, while the instantaneous slope variable SLOPEinst is based on the difference between the last and next-to-last GBAR2 values stored in the RSB over a 1 ms interval.

The blocks 48–56 are then executed to update a set of three counters referred to herein as load counter LD CTR, transition counter TR CTR, and yield counter YD CTR. The count stored in LD CTR represents the portion of the TTW routine spent in loading, as defined in FIG. 3, the count stored in TR CTR represents the portion of the TTW routine spent in transition, and the count stored in YD CTR represents the portion of the TTW routine spent in yielding. Loading is identified at block 50 if SLOPEinst is greater than or equal to a loading reference REF1. In this case, the controller additionally updates GBAR2ul, a floating average of SLOPEinst during the loading portion of the data collection. Yielding is identified at block 54 if SLOPEinst is less than or equal to a yielding reference REFy.

The blocks 58 and 60 are then executed to update GBAR1 by subjecting ACCEL to an exponential low pass filter, and to calculate the Predicted Occupant Displacement (POD). The POD computation is based on the instantaneous displacement and velocity terms D(t) and V(t), the filtered acceleration GBAR1, and the assumed inflation time T of 30 ms. A factor F1 determined as a function of the time in yield (YD CTR) is applied to the velocity term V(t) to increase the predicted occupant displacement to improve timing in localized impacts.

Referring now to the TTW Comparison portion of the TTW routine in FIG. 6, the block 62 is first executed to determine if the time elapsed after enablement of the TTW routine is greater than a reference time TIMEref corresponding to a minimum time deployment. If the time in TTW is less than the reference time, as in a minor, short duration stimulus, deployment is inhibited. In this case, block 64 is executed to determine if the sensed event is over, as determined by various reset conditions. If not, the microcontroller 14 is returned to TTW Data Collection (FIG. 5); if so, the microcontroller is returned to Pre-Enable (FIG. 4). If the recent average slope SLOPErec is greater than a high threshold REFhi, as determined at block 66, a high speed crash event is indicated and the block 68 is executed to modify the Occupant Displacement Threshold ODT so as to proceed to the Severity routine without further delay. Finally, the Predicted Occupant Displacement is compared with the Occupant Displacement Threshold to determine if the Severity step should be enabled. As indicated above, the threshold is selected to satisfy the deployment timing requirements. If POD exceeds ODT, as determined at block 70, the Severity step is enabled. Otherwise, block 64 is executed to determine if the sensed event is over as indicated above.

In the Severity step of the flow diagram of FIG. 7, the microcontroller 14 constructs a pulse model of the crash. The acceleration envelope of the crash pulse is reconstructed as a half-sine waveform, and the effective change in velocity Veff of the crash pulse is computed as the area under the waveform. In computing the area, the microcontroller 14 first computes the peak amplitude of the crash pulse. The blocks 80–86 determine the peak slope SLpeak of the acceleration envelope. If the recent average slope SLOPErec is greater than AVG SLOPEul, computed at block 80, the peak slope SLpeak is set equal to SLOPErec. Otherwise, SLpeak is set equal to AVG SLOPEul. Blocks 88–90 then compute the duration of the pulse waveform. The base pulse duration BASE is determined as a function of the time under load—that is, the count in LD CTR. A stretch term F provides a measure of the amount of yielding and transition, and is computed as a function of the square of the non-loading time—that is, the sum of the counts in YD CTR and TR CTR. The term F is summed with BASE as indicated at block 90 to form the pulse duration PD. The term F thereby operates to effectively lengthen the pulse duration if a localized impact is indicated. Lengthening the crash pulse duration increases the area under the pulse waveform, and therefore, the estimated severity of the crash.

The peak amplitude Ap of the crash pulse is then determined at block 92 as a function of GBAR2ul, SLpeak, PD and the time to wait TTW. Finally, the area under the waveform is computed to form a measure of the effective velocity Veff of the crash. The area Veff, is computed as a function of the period PD and the peak amplitude Ap as indicated at block 94.

If Veff exceeds a threshold, as determined at block 96, the block 98 is executed to issue an deployment command. Otherwise, the block 100 is executed to determine if the crash pulse is completed. If so, the microcontroller is directed to the Pre-Enable routine; if not, block 102 is executed to update GBAR2ul, SLOPErec and LD CTR, and to reexecute the Severity routine.

While this invention has been described in reference to the illustrated embodiment, it will be recognized that various modifications will occur to those skilled in the art, and that controls incorporating such modifications may fall within the scope of this invention, which is defined by the appended claims.

The embodiments of the invention in which an exclusive property or privilege is claimed are defined as follows:

1. A control method for deployment of a supplemental inflatable restraint (SIR) in a motor vehicle based on a measured vehicle acceleration to arrest occupant displacement, the method comprising the steps of:
   in response to an initiation of a vehicle crash event, repeatedly integrating the measured vehicle acceleration to form signals corresponding to initial vehicle velocity and initial vehicle displacement, filtering the measured vehicle acceleration to form a signal corresponding to an average vehicle acceleration, and estimating a future occupant displacement due to the crash event in accordance with the initial displacement signal, the initial velocity signal, the average vehicle acceleration signal and a time interval nominally required to deploy said SIR;
   comparing said estimate of future occupant displacement to a threshold displacement corresponding to a maximum desired occupant displacement at the time of SIR deployment;
   estimating severity of the crash event once said estimate of future occupant displacement exceeds said threshold displacement; and
   deploying the SIR when the estimated severity of the crash event exceeds a predetermined severity threshold.

2. The control method set forth in claim 1, wherein the crash event includes a period of yielding corresponding to structural collapse during a localized crash event, and the control method further comprises the steps of:
   identifying the occurrence of yielding; and
   increasing the estimated occupant displacement when the occurrence of yielding is identified so as to cause the estimated occupant displacement to exceed the threshold displacement sooner than would otherwise occur, thereby hastening SIR deployment in localized crash events.

3. The control method set forth in claim 1, wherein the crash event includes a period of yielding corresponding to structural collapse during a localized crash event, and the step of estimating occupant displacement further comprises the steps of:
   identifying the occurrence of yielding; and
   increasing the initial vehicle velocity signal when the occurrence of yielding is identified so as to cause the estimated occupant displacement to exceed the threshold displacement sooner than would otherwise occur, thereby hastening SIR deployment in localized crash events.

4. The control method set forth in claim 1, including the steps of:
   determining a slope of the measured vehicle acceleration;
   comparing the determined slope to a reference slope corresponding to a high speed crash event; and
   decreasing the threshold displacement when the determined slope exceeds the reference slope so as to cause the threshold displacement to be exceeded sooner than would otherwise occur.

5. The control method set forth in claim 1, wherein the crash event includes a period of yielding corresponding to structural collapse during a localized crash event, and the control method further comprises the steps of:
   periodically identifying the occurrence of yielding;
   developing a yield count which increases in value each time yielding is identified during the crash event; and
   increasing the estimated occupant displacement by an amount determined in relation to the yield count so as to cause the estimated occupant displacement to exceed the threshold displacement sooner than would otherwise occur, thereby hastening SIR deployment in localized crash events.

6. The control method set forth in claim 1, wherein the crash event includes a period of yielding corresponding to structural collapse during a localized crash event, and the control method further comprises the steps of:
   periodically identifying the occurrence of yielding;
   developing a yield count which increases in value each time yielding is identified during the crash event; and
   increasing the initial vehicle velocity signal by an amount determined in relation to the yield count so as to cause the estimated occupant displacement to exceed the threshold displacement sooner than would otherwise occur, thereby hastening SIR deployment in localized crash events.

7. The control method set forth in claim 1, wherein the step of determining the severity of the crash event comprises the steps of:
   determining a slope of the measured vehicle acceleration;
   estimating a duration of the crash event;
   estimating the severity of the crash event as a function of said slope and said duration.

8. The control method set forth in claim 7, wherein the crash event includes a period of structural collapse during a localized crash event, and the control method includes the steps of:
   identifying the occurrence of structural collapse; and
   increasing the estimated duration of the crash event when the occurrence of structural collapse is identified so as to increase the estimated severity of the crash event.

9. The control method set forth in claim 7, wherein the crash event includes a period of structural collapse during a localized crash event, and the control method further comprises the steps of:

periodically identifying the occurrence of structural collapse;

developing a count which increases in value each time structural collapse is identified during the crash event; and increasing the estimated duration of the crash event by an amount determined in relation to the developed count so as to increase the estimated severity of the crash event.

10. The control method set forth in claim 7, wherein the crash event includes a period of structural collapse during a localized crash event, and the control method further comprises the steps of:

periodically identifying the occurrence of structural collapse;

developing a count which increases in value each time structural collapse is identified during the crash event;

squaring the developed count; and increasing the estimated duration of the crash event by an amount determined in relation to the squared count so as to increase the estimated severity of the crash event.

* * * * *